US008537665B2

(12) United States Patent
Avasarala

(10) Patent No.: US 8,537,665 B2
(45) Date of Patent: Sep. 17, 2013

(54) METHOD AND APPARATUS FOR BLOCKING MESSAGES FROM A SENDER BY A WIRELESS COMMUNICATION DEVICE

(75) Inventor: Ranjit Avasarala, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 579 days.

(21) Appl. No.: 12/426,473

(22) Filed: Apr. 20, 2009

(65) Prior Publication Data
US 2010/0267402 A1 Oct. 21, 2010

(51) Int. Cl.
 H04L 12/26 (2006.01)
 H04L 12/56 (2011.01)
 H04M 1/66 (2006.01)
 H04M 3/16 (2006.01)

(52) U.S. Cl.
 USPC ............ 370/230; 370/235; 370/392; 455/410

(58) Field of Classification Search
 None
 See application file for complete search history.

(56) References Cited

U.S. PATENT DOCUMENTS

| 7,155,243 | B2 | 12/2006 | Baldwin et al. |
| 7,242,673 | B2 | 7/2007 | Tu et al. |
| 7,962,124 | B1 * | 6/2011 | Bharatia et al. ............ 455/412.1 |
| 2002/0161833 | A1 * | 10/2002 | Niven et al. .................. 709/203 |
| 2005/0020289 | A1 | 1/2005 | Kim et al. |
| 2006/0019618 | A1 * | 1/2006 | Seppala ........................ 455/121 |
| 2006/0281447 | A1 | 12/2006 | Lewis et al. |
| 2007/0026879 | A1 | 2/2007 | Ala-Luukko |
| 2007/0143422 | A1 | 6/2007 | Cai |
| 2007/0197212 | A1 | 8/2007 | Marsico et al. |
| 2007/0249374 | A1 | 10/2007 | Hu et al. |
| 2008/0132258 | A1 | 6/2008 | Hsu et al. |
| 2010/0036918 | A1 * | 2/2010 | Gupta ........................... 709/206 |

FOREIGN PATENT DOCUMENTS

| EP | 1689138 A1 | 8/2006 |
| EP | 1806885 A1 | 7/2007 |
| EP | 1763261 B1 | 8/2008 |
| WO | 2004008701 A1 | 1/2004 |
| WO | 2007124033 A1 | 11/2007 |

OTHER PUBLICATIONS

Deng, Wang: Huwaei enhanced SMS solutions, Huwaei Technologies Aug. 2005, Issue 17, http://www.huawei.com/publications/view.do?id-287&cid=94&pid=61, pp. 60-63.
Courtenay, Dr. Andrew: Patents Act 1977: Combined Search and Examination Report under Sections 17 and 18(3), Intellectual Property Office, Patents Directorate, South Wales, Aug. 20, 2010, all pages.
The State Intellectual Property Office of the People'S Republic of China, Notification of First Office Action, Jun. 15, 2012, all pages.

* cited by examiner

*Primary Examiner* — Chirag Shah
*Assistant Examiner* — Ashley Shivers

(57) ABSTRACT

A method and apparatus for blocking messages from a sender by a wireless communication device is disclosed. A wireless communication device is provided that receives (230) a selection of a message from a user, displays (235) an option to block a sender of the selected message to the user, receives (240) an instruction to block the sender of the selected message from the user, creates (270) a block document that includes an identifier of the sender, and sends (280) the block document to a server. The block document notifies the server to block the sender from sending messages to the wireless communication device. The wireless communication device also subscribes (245) with the server for a message blocking service and receives (250) a template from the server. The wireless communication device creates the block document using the template.

23 Claims, 3 Drawing Sheets

METHOD AND APPARATUS FOR BLOCKING MESSAGES FROM A SENDER BY A WIRELESS COMMUNICATION DEVICE

FIELD OF THE DISCLOSURE

The present disclosure relates generally to wireless communication systems, and more particularly to a method and apparatus for blocking messages from a sender by a wireless communication device.

BACKGROUND

In a wireless communication system, various wireless communication devices communicate with each other over an air interface using radio links. Communication between devices may include setting up voice calls and transmitting/receiving messages.

Nowadays, many businesses advertise about their new products by sending messages to the users of the wireless communication devices. For example, businesses like banks advertise about loans, new credit cards, and investments plans by sending messages to the users on their wireless communication devices. Moreover, some users may be constantly sending unwanted messages to other users' wireless communication devices. These messages could sometimes be very annoying for the user of the device receiving the messages.

Accordingly, there is a need for a method and apparatus for blocking messages from a sender by the wireless communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
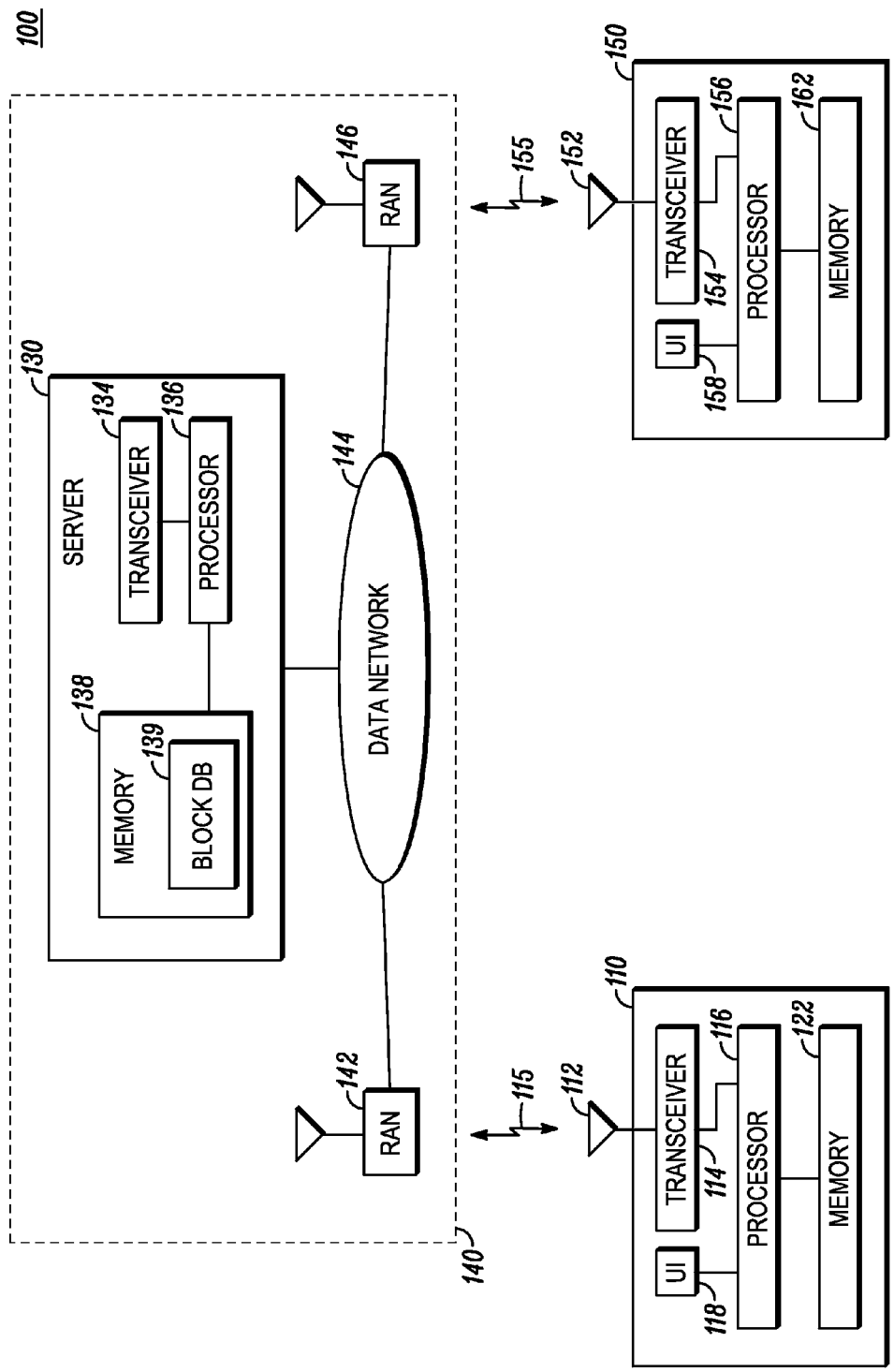
FIG. 1 is a block diagram of a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

To address the need for a method and apparatus for blocking messages from a sender, a wireless communication device is provided that receives a selection of a message from a user from a plurality of received messages. The wireless communication device further receives a choice of an option from the user to block the sender of the selected message. In response, the wireless communication device creates a block document that includes an identity of the sender and sends the block document to a server. The block document notifies the server to block the sender from sending messages to the wireless communication device. This ensures that the wireless communication device does not receive any more messages from the particular sender. The wireless communication device can block messages from any number of senders using this method.

FIG. 1 is a block diagram of a wireless communication system 100 in accordance with an embodiment of the present invention. Wireless communication system 100 comprises multiple wireless communication devices 110, 150 (two shown), for example, a cellular telephone, a smartphone, a radiotelephone, or a digital terminal equipment, a laptop computer, or a personal computer that supports wireless communications. In various technologies, wireless communication devices 110, 150 may be referred to as a mobile station, a user equipment, a subscriber unit, a user terminal, or an access terminal.

Wireless communication system 100 further comprises a wireless communication network 140 that includes one or more radio access networks 142, 146 (two shown). A first radio access network (RAN) 142 of the one or more radio access networks 142, 146 provides wireless communication services to a first wireless communication device 110 of the multiple wireless communication devices 110, 150 via a first radio link 115, and a second RAN 146 of the one or more radio access networks 142, 146 provides wireless communication services to a second wireless communication device 150 of the multiple wireless communication devices 110, 150 via a second radio link 155. The wireless network 140 further comprises a server 130 in communication with each of RANs 142, 146 via a data network 144. However, in another embodiment of the present invention, each of the wireless communication devices 110, 150 may be served by a same RAN and/or each RAN 142, 146 may communicate with server 130 via a different data network, which data networks are, in turn, capable of communicating with each other. As is apparent to one of ordinary skill in the art, wireless communication network 140 further includes additional network elements, for example, a base station transceiver and a base station controller of the RANs, various gateways, authentication and billing nodes, support nodes, and application servers, that are not depicted herein so as not to obscure the disclosure with details that will be readily apparent to those of ordinary skill in the art having the benefit of the description herein.

Each of the wireless communication devices 110, 150 includes a respective processor 116, 156 such as one or more microprocessors, microcontrollers, digital signal processors (DSPs), combinations thereof or such other devices known to those having ordinary skill in the art. The particular operations/functions of processors 116 and 156, and respectively thus of wireless communication devices 110 and 150, are determined by an execution of software instructions and routines that are stored in a respective at least one memory device 122, 162 associated with the processor, such as random access memory (RAM), dynamic random access memory (DRAM), and/or read only memory (ROM) or equivalents thereof, that store data and programs that may be executed by the corresponding processor.

Each of the wireless communication devices 110, 150 further includes a respective user interface 118, 158 and a transceiver 114, 154 that are coupled to the respective processors 116, 156. In addition, each of the wireless communication devices 110, 150 includes a respective antenna 112, 152 coupled to their respective transceivers 114, 154. The user interfaces 118, 158, for example, can include a microphone, an audio speaker, a display, a keyboard, and so on. Each of transceivers 114, 154 comprises a transmitter and a receiver for sending messages to, and receiving messages from, wireless network 140 via a corresponding radio link 115, 155. For purposes of illustrating the principles of the present invention, the wireless communication device 110 sends a message to the wireless communication device 150 in the example of FIG. 1. Therefore, for the sake of simplicity, the wireless communication device 110 may also be referred to herein as "the sender."

In various embodiments of the present invention, the server 130 may be located in anywhere in network 140 that may be communicated with by RANs 142 and 146, for example, in a SIP-enabled network node, or may be located in one of RANs 142 and 146. When the sender 110 sends a message to the wireless communication device 150, the message passes through the server 130 or a network element of communication system 100 consults with the server 130 before forwarding the message.

The server 130 includes a transceiver 134 and an at least one memory device 138 that are each coupled to a processor 136. The transceiver 134 includes a receiver and a transmitter for receiving and transmitting messages via data networks 144 and 148. The processor 136, such as one or more microprocessors, microcontrollers, digital signal processors (DSPs), combinations thereof or such other devices known to those having ordinary skill in the art, is responsible for the processing of messages in the server 130. The at least one memory device 138 stores data and instructions that are executed by processor 136 and permit a functioning of server 130 in communication system 100. The at least one memory device 138 further maintains a block database 139 that, in turn, maintains a list of senders to be blocked. The block database 139 may also store message types to be blocked and a time duration for blocking messages from a particular sender. Unless otherwise specified herein, the functions described herein as being performed by each of the wireless communication devices 110 and 150 and server 130 are performed by the processor 116, 156, 136 of the wireless communication devices and server.

In one embodiment of the present invention, the transceiver 134 of the server 130 receives a message, via radio link 115 and RAN 142, from the sender 110 and intended for the wireless communication device 150. The server 130 transmits the message to the wireless communication device 150 via RAN 146 and radio link 155. The receiver of the wireless communication device 150 receives the message and stores the message in the at least one memory device 162. Upon receiving the message, the wireless communication device 150 notifies a user of the wireless communication device 150 that a message has been received, using known user notification techniques.

In one embodiment of the invention, when the wireless communication device receives the message, the user of the wireless communication device 150 may be able to pull up a menu of actions associated with the message, via user interface 158 and which menu is stored in at least one memory device 162, that includes a "block" option that provides for a blocking of future messages from the sender of the message. In another embodiment of the invention, subsequent to receiving the message from the sender, the user then may select the received message by pulling up, via user interface 158, a list of received messages or received message identifiers stored by the wireless communication device 150 and selecting the message from the list of stored messages/message identifiers. When the wireless communication device 150 receives the user's selection of the message, the wireless communication device presents the user, via user interface 158, with a menu of actions in association with the message, including a "block" option for blocking future messages from the sender of the message. In yet another embodiment of the present invention, when the user selects to DELETE a message, then the wireless communication device 150 may present to the user, via the user interface 158 and based on instructions stored in at least one memory device 162, a "block" option for blocking future messages from the sender of the message.

If the user selects the block option, then communication system 100 will block future messages from the sender of the selected message from being transferred to wireless communication device 150. The "block" option may be programmed in the wireless communication device 150 by a manufacturer of the wireless communication device. In one example, the block option may be directly available in a menu of actions associated with the message and displayed on user interface 158.

When the user of the wireless communication device 150 chooses the option to block the sender of the selected message from sending messages, then the processor 156 of the wireless communication device 150 assembles a message subscribing the wireless communication device 150 to a message blocking service and conveys the assembled message to the server 130 via radio link 155 and RAN 146. In one embodiment of the present invention, the wireless communication device 150 is able to communicate with the server 130 based on routing information associated with the server and maintained in the at least one memory device 162 of the wireless communication device. For example, the routing information may be preprogrammed into the wireless communication device or may be provisioned to the wireless communication device when the wireless communication device registers with network 140. In another embodiment of the present invention, the wireless communication device 150 may not know the address of the server 130 and, instead, messages intended for the server are routed to the server by RAN 146 or another network element of network 140 that recognizes messages intended for the server, maintains routing information for the server, and then forwards such messages to the server. In one example, the server 130 may be located in a base station. In another example, the server 130 may be located in a SIP-enabled network node.

In response to receiving the subscription to the message blocking service, the server 130 sends to the wireless communication device 150 via RAN 146 and radio link 155, and the wireless communication device 150 receives from the server, a "block message" template. The template may be a XML template or any other type of template. The wireless communication device 150 then stores the template in the at least one memory device 162 of the wireless communication device. By storing the template in the at least one memory device 162, wireless communication device 150 may choose to block senders of other messages received by the wireless communication device without again subscribing to the message blocking service and having to again obtain a "block message" template.

The processor 156 of the wireless communication device 150 uses the stored template to create a block document. In response to the user of the wireless communication device selecting a "block" option, the processor retrieves the template and assembles, and sends to the server 130, via radio link 155 and RAN 146, a message that includes the block document and an identifier associated with the wireless communication device 150. The block document may be an XML document, a text document, or any other type of document depending upon the template. The wireless communication device 150 may use a HTTP PUT message for sending the block document to the server 130.

The block document includes an identifier associated with the sender to be blocked, that is, sender 110, and further notifies the server 130 to block messages from the sender 110 that are intended for the wireless communication device 150. In another embodiment of the present invention, the block document also may include one or more of a message type to be blocked and a time duration for a blocking of messages of the identified sender.

In response to receiving the block document, the server 130 routes the block document to the processor 136 of the server and the processor updates the block database 139 by storing, in the database, an identifier associated with the sender to be blocked, that is, sender 110, in association with an identifier associated the wireless communication device 150. Subsequent to receiving the block document and updating the block database 139, the processor 136 in the server 130 discards, or arranges for a discarding by network 140 of, future messages received from the sender 110 and intended for the wireless communication device 150. As a result, the wireless communication device 150 is successfully able to block the sender 110 from sending any further messages to the wireless communication device 150.

Figure 2:
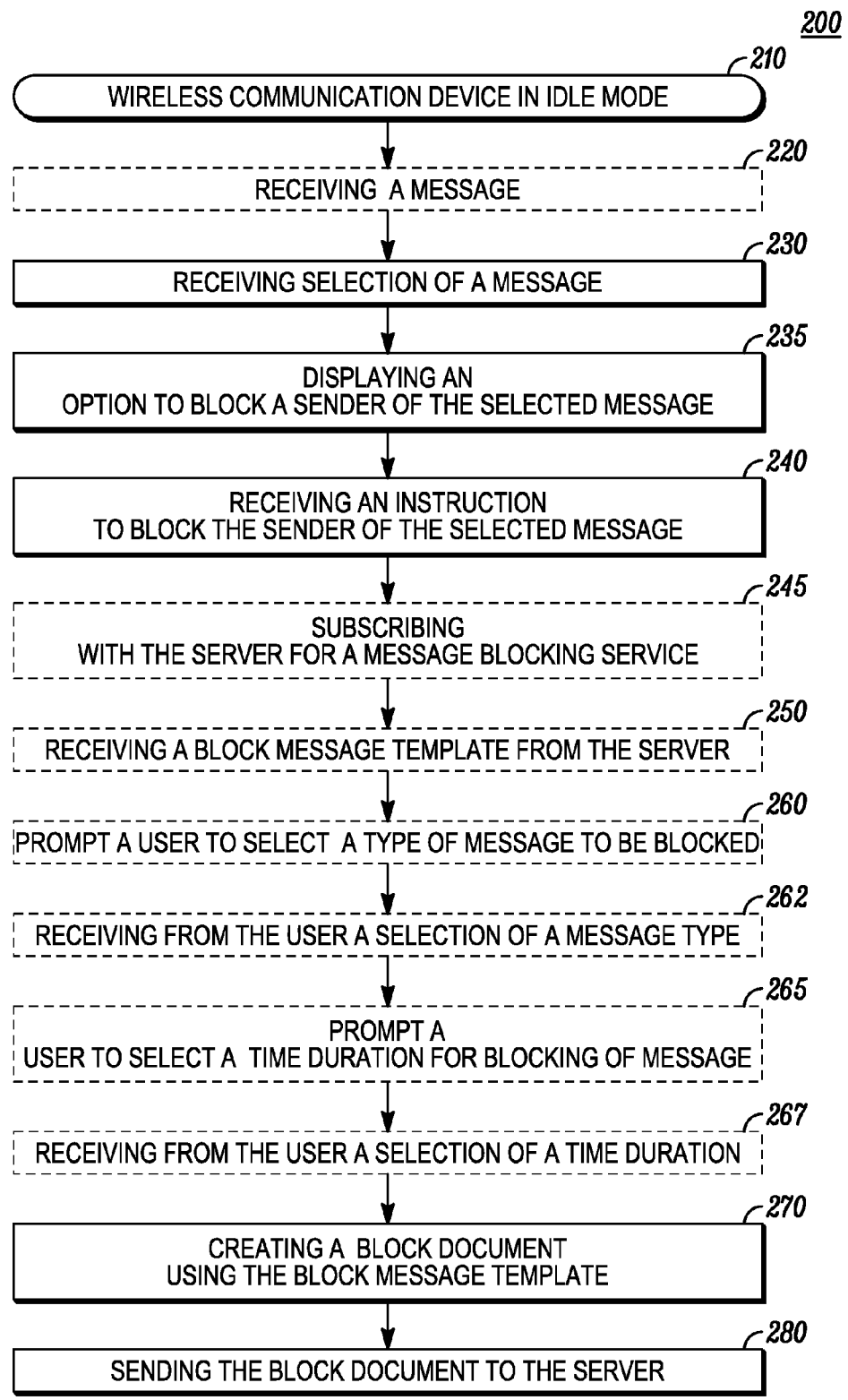
FIG. 2 is a flowchart of a method for a wireless communication device to block messages from a sender in accordance with some embodiments.

Referring now to FIG. 2, a flowchart is provided depicting a method 200 executed by the wireless communication device 150 in blocking messages from the sender 110 in accordance with an embodiment of the present invention. The method 200 starts with the wireless communication device 150 in idle mode 210. In one embodiment, the wireless communication device 150 receives 220 a message. The wireless communication device 150 presents, to a user of the wireless communication device and on user interface 158, a notification of received message and receives 230, from the user, a selection of the message. In another embodiment, the wireless communication device 150 may display, on user interface 158 to the user of the wireless communication device, a list of messages stored in the at least one memory device 162 of the wireless communication device and then receive, from the user, a selection 230 of a message from of the list of received messages. This latter embodiment permits a user to block a sender of a past message, as opposed to a currently received message.

After receiving a selection of the message, the wireless communication device 150 displays 235, on user interface 158, an option to block the sender of the selected message, that is sender 110. The "block option" may be programmed in the wireless communication device 150 by a manufacturer of the wireless communication device 150. In one example, the block option may be directly available in a displayed menu of actions associated with the message. In another embodiment of the present invention, in response to receiving an instruction from the user to delete a message, the wireless communication device 150 may display 235 to the user an option to block the sender of the message. In response to displays an option to block the sender 110 of the selected message, the wireless communication device 150 receives 240, from the user via the user interface 158, an instruction to block the sender, for example, via a selection, by the user, of the "block option."

When the wireless communication device 150 is instructed 240 to block the sender 110 and the wireless communication device is not subscribed to a message blocking service, then the wireless communication device first subscribes 245 with the server 130 for the message blocking service. In response to subscribing to the service, the wireless communication device 150 receives 250 a "block message" template from the server 130. In another embodiment, the wireless communication device 150 may subscribe 245 with the server for the message blocking service while in the idle mode 210.

In response to receiving 240 a selection of the block option from the user, in one example, the wireless communication device 150 may prompt 260 the user to select a type of message to be blocked and receive 262, from the user, a selection of a message type. For example, the type of message may include SMS only, MMS only, or both SMS and MMS. For example, if the user selects SMS only, then the server 130 will block SMS messages from the sender 110 and intended for the wireless communication device 150, but the wireless communication device may still receive MMS messages from the sender 110. Similarly, if the user selects both SMS and MMS, then the server 130 will block SMS as well as MMS messages from the sender 110.

The wireless communication device 150 further may prompt 265 the user to select a time duration for a blocking of the messages and receive 267, from the user, a selection of a time duration. The time duration may include a temporary blocking of messages and a permanent blocking of messages and/or may include a time period that may be input by the user. If the user selects a permanent blocking of messages, then the server 130 permanently blocks future messages from being sent to the wireless communication device. If the user selects the temporary blocking of messages, then the wireless communication device 150 may prompt the user of the wireless communication device to input a specific time period for a blocking the messages. For example, the user may want to block a sender for a subsequent designated number of days or hours, for designated days of the week, or on weekdays in between 9 am to 5 pm. So, the user can enter the specific time period during which the message is to be blocked.

In response to receiving a message selection and any designation of a message type or a time duration from the user, the wireless communication device 150 creates 270 a block document using the "block message" template received from the server 130. The block document may be an XML document, a text document, or any other type of document depending upon the template. The block document includes an identifier of the sender 110, such as a mobile station identifier (MS_ID), a name associated with the sender, a uniform resource identifier (URI) associated with the sender, or the sender's telephone number. In an example, if the wireless communication device 150 receives constant messages from a sender named "SAVE ELECTRICITY" and the wireless communication device does not have an exact URI or telephone number for this sender, then the wireless communication device sends "SAVE ELECTRICITY" as the identifier of the sender to the server. Upon receiving "SAVE ELECTRICITY" as the identifier of the sender, the server 130 performs a lookup and fetches the asserted identity of the sender to be blocked. The server, subsequently, uses the asserted identity of the sender to block the sender.

The block document may additionally include the type of messages to be blocked, the time duration of the block, and the specific time period for the blocking of the messages, and an identifier associated with wireless device 150.

After creating 270 the block document, the wireless communication device 150 assembles a message that includes the block document and sends 280 the message to the server 130.

For example, the wireless communication device 150 may include the block document in a HTTP PUT message that then is sent to the server 130. The block document notifies the server 130 to block messages from the sender 110 from being transferred to the wireless communication device 150.

As a result, the wireless communication device 150 is able to block the sender 110 from sending any further messages to the wireless communication device. This method of blocking messages also provides an opportunity to the user of the wireless communication device to block a sender from sending messages for a particular period of time. It also enables the user of the wireless communication device to decide the type of messages to be blocked. Moreover, this method provides the user of the wireless communication device with the ability to block a sender even though the sender's identity (URI or telephone number) is not known or clear.

Figure 3:
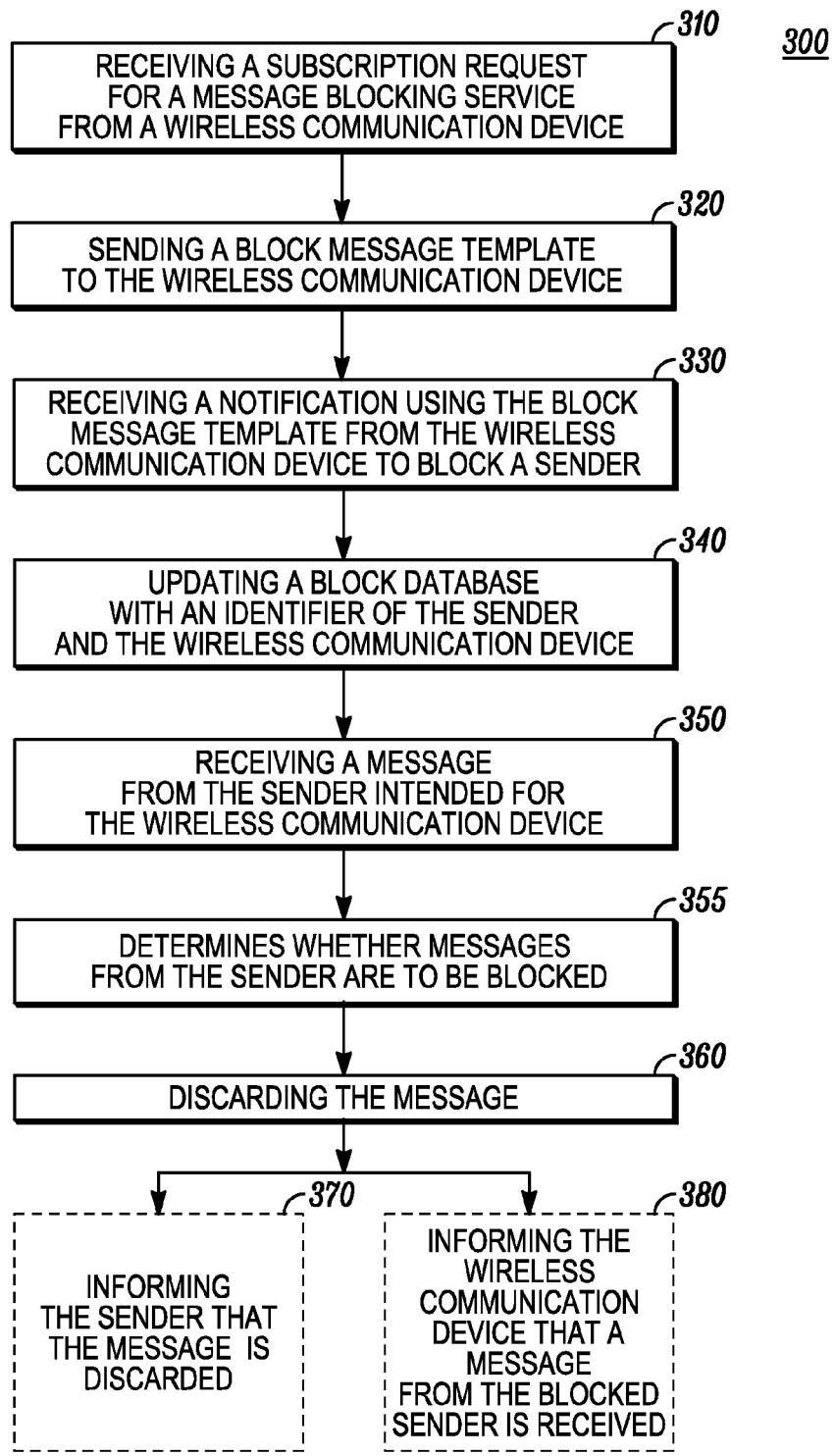
FIG. 3 is a flowchart of a method for a server to block messages from a sender to a wireless communication device in accordance with some embodiments.

FIG. 3 is a flowchart of a method 300 executed by the server 130 in blocking messages from a sender, such as sender 110, to a wireless communication device, such as wireless communication device 150, in accordance with an embodiment of the present invention.

The method 300 starts when the server 130 receives 310 a subscription request for a message blocking service from the wireless communication device, that is, wireless communication device 150. In response, to receiving the subscription request, the server 130 sends 320 a "block message" template to the wireless communication device 150. The template may be a XML template or any other type of template.

Subsequent to sending the template, the server receives 330 a notification from the wireless communication device 150 to block a sender, that is, sender 110. The format of the notification may vary based on the "block message" template. For example, the notification may comprise a block document created using the template and sent using HTTP PUT messages from the wireless communication device to the server 130. The notification informs the server 130 to block the messages from the sender 110. The notification includes an identifier of the sender to be blocked, such as the sender's name, sender's uniform resource identifier, or sender's telephone number and an identifier associated with the wireless communication device 150. The notification may additionally include a type of message to be blocked, a time duration of the block, and a specific time period associated with the blocking.

After receiving 330 the notification, the server updates 340 a block database 139 by storing the identifier of the sender 110 in association with an identifier associated with the wireless communication device 150. When the server 130 receives a name (for example, SAVE ELECTRICITY) of the sender as the identity and does not receive an exact URI or a telephone number, then the server may perform a lookup and retrieve the asserted identity of the sender. In this case, the server updates 340 the block database with the asserted identity of the sender.

Additionally, the server 130 may also update 340 the block database with information regarding a type of message to be blocked (for example, SMS only, MMS only, both SMS and MMS), a time duration for the block (for example, temporary or permanent), and a specific time period during which the message is to be blocked (for example, weekdays in between 9 am to 5 pm).

After receiving 330 the notification and updating 340 the block database, when the server 130 subsequently receives 350 a message from the sender 110 and intended for the wireless communication device 150, the server determines 355, by reference to the block database, that messages from this sender are to be blocked. The server 130 then arranges for a discarding 360 of the message, for example, discarding the message itself or instructing a network element in possession of the message to discard 360 the message. In addition to arranging for the message to be discarded, the server 130 may inform 370 the sender 110 that the message is discarded. The server 130 may also inform 380 the wireless communication device 150 that a message from the blocked sender has been received.

By allowing a user of a wireless communication device to specify a future type of message to be blocked and a blocking time period, the wireless communication system 100 provides a customizable blocking service that permits the wireless communication device 150 to successfully block the sender 110 from sending any further messages to the wireless communication device. Moreover, the blocking service also helps a service provider subscribed to by the user of the wireless communication device 150 to earn additional revenue as a result of offering a message blocking service to subscribers to the services of the service provider.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for blocking messages from a sender by a wireless communication device, the method comprising:
    receiving, from a user of the wireless communication device, a selection of a message from a plurality of received messages;
    receiving, from the user of the wireless communication device, a choice of an option to block the sender of the selected message;
    in response to receiving the option to block, subscribing by the wireless communication device with the server, for a message blocking service;
    receiving, by the wireless communication device and in response to subscribing for the message blocking service, a template from the server;
    storing, by the wireless communication device, the template;
    creating, by the wireless communication device, a block document based on the stored template, wherein the block document includes an identifier of the sender; and
    sending, by the wireless communication device, the block document to a server, wherein the block document notifies the server to block the sender from sending messages to the wireless communication device.

2. The method of claim 1 further comprising:
    prompting the user, by the wireless communication device, to select a type of messages to be blocked;
    receiving, from the user, a selection of the type of messages to be blocked, wherein the type of messages comprises SMS only, MMS only, and both SMS and MMS; and
    indicating, in the block document, the selection received from the user of the type of messages to be blocked.

3. The method of claim 2 further comprising:
    prompting the user, by the wireless communication device, for a time duration of the blocking of the messages; and
    receiving, from the user, a selection of the time duration associated with the blocking of the messages.

4. The method of claim 3, wherein the time duration comprises a temporary blocking of the messages and a permanent blocking of the messages.

5. The method of claim 4 further comprises, in response to receiving from the user, a temporary time duration associated with the blocking of the messages, prompting the user, by the wireless communication device, for a specific time period associated with a blocking of the messages.

6. The method of claim 1, wherein the block document comprises one or more of a type of messages to be blocked and a time duration of the block.

7. The method of claim 6, wherein the block document further comprises a specific time period associated with a blocking of the messages.

8. The method of claim 1 wherein the template is a XML template and wherein the block document is one of an XML document or a text document.

9. The method of claim 1, wherein sending further comprises sending the block document to the server using a HTTP PUT message.

10. The method of claim 1, wherein the identifier is at least one of the sender's name, the sender's uniform resource identifier (URI), or the sender's telephone number.

11. The method of claim 1, wherein the server is located in a base station.

12. The method of claim 1, wherein the server is located in a SIP-enabled network node.

13. A method in a server for blocking messages from a sender to a wireless communication device, the method comprising:
    receiving a subscription request from the wireless communication device for a message blocking service, wherein the message blocking service being an option to block a selected message from a user of the wireless communication device;
    in response to receiving the subscription request, sending a template to the wireless communication device wherein the template is to be stored by the wireless communication device;
    receiving, from the wireless communication device, a block document based on the stored template, wherein the block document notifies to block the sender from sending messages to the wireless communication device, wherein the block document further includes a time duration for blocking the sender;
    based on the block document, updating a block database with an identifier of the sender and an identifier of the wireless communication device;

subsequent to receiving the notification, receiving from the sender, a message intended for the wireless communication device;

arranging for a discarding of the message without sending the message to the wireless communication device.

14. The method of claim 13 further comprising:

informing the wireless communication device that the message from the sender is received.

15. The method of claim 13 further comprising:

informing the sender that the message is discarded.

16. A wireless communication device comprising:

a receiver for receiving a message;

a user interface for selecting the message, for providing an option to block a sender of the selected message to a user of the wireless communication device, and for receiving from the user a selection of the option to block the sender of the selected message;

a processor, coupled to the user interface, for subscribing, in response to receiving the option to block, to a message blocking service, receiving, via the receiver and in response to subscribing to the message blocking service, a template from a server hosting the message blocking service, and creating a block document, wherein the block document includes an identifier of the sender;

a memory for storing the template, wherein the block document is based on the stored template; and a transmitter for sending the block document to a server, wherein the block document notifies the server to block the sender from sending messages to the wireless communication device.

17. The wireless communication device of claim 16, wherein the processor is configured to prompt the user, via the user interface, to select a type of messages to be blocked, to receive, via the user interface, a selection of the type of messages to be blocked, wherein the type of messages comprises SMS only, MMS only, and both SMS and MMS and to indicate, in the block document, the selection received from the user of the type of messages to be blocked.

18. The wireless communication device of claim 17, wherein the processor is configured to prompt the user, via the user interface, for a time duration of the blocking of the messages, to receive, from the user via the user interface, a selection of the time duration associated with the blocking of the messages, and to indicate, in the block document, the selection received from the user of the time duration associated with the blocking of the messages.

19. The wireless communication device of claim 16, wherein the block document comprises one or more of a type of messages to be blocked and a time duration of the block.

20. A server for blocking messages from a sender to a wireless communication device, the server comprising:

a transceiver;

an at least one memory device that maintains a block database, in association with the wireless communication device, senders to be blocked and message types to be blocked; and a processor for receiving, via the transceiver, a subscription request from the wireless communication device for a message blocking service, wherein the message blocking service being an option to block a selected message from a user of the wireless communication device, sending, in response to receiving the subscription request and via the transceiver, a template to the wireless communication device, wherein the template is to be stored by the wireless communication device, receiving, via the transceiver from the wireless communication device, a block document based on the stored template, wherein the block document notifies to block the sender from sending messages to the wireless communication device, and wherein the block document further includes a time duration for blocking the sender, and based on the block document, updating the block database with an identifier of the sender and an identifier of the wireless communication device and for discarding a message received from the sender and intended for the wireless communication device without sending the message to the wireless communication device.

21. The server of claim 20 further comprising:

a transmitter for notifying the wireless communication device that the message from the sender is received and for notifying the sender that the message is discarded.

22. A base station comprising the server of claim 20.

23. A SIP-enabled network node comprising the server of claim 20.

* * * * *